United States Patent [19]

Kartalopoulos

[11] Patent Number: 4,575,583

[45] Date of Patent: Mar. 11, 1986

[54] PROGRAMMABLE DIGITAL CONTROLLER FOR GENERATING INSTRUCTIONS

[75] Inventor: Stamatios V. Kartalopoulos, Rockaway Township, Morris County, N.J.

[73] Assignee: AT&T Bell Laboratories, Murray Hill, N.J.

[21] Appl. No.: 307,490

[22] Filed: Oct. 1, 1981

[51] Int. Cl.[4] .............................................. H04M 3/00
[52] U.S. Cl. ................................................ 179/18 ES
[58] Field of Search ................ 364/200 MS File, 171, 364/130, 200, 900; 179/18 ES

[56] References Cited

U.S. PATENT DOCUMENTS

| 3,643,226 | 2/1972 | Loizedes et al. | 364/200 |
| 3,979,728 | 9/1976 | Reddaway | 364/200 |
| 4,135,242 | 1/1979 | Ward et al. | 364/200 |
| 4,168,523 | 9/1979 | Chori et al. | 364/200 |

Primary Examiner—Gareth D. Shaw
Assistant Examiner—John G. Mills
Attorney, Agent, or Firm—Robert O. Nimtz; Patrick E. Roberts

[57] ABSTRACT

A programmable digital controller has an address matrix memory (20) and an instruction matrix memory (10). The address memory stores address words each having the address of the first sample and the number of samples in a unique group of samples. Unique groups of samples are sequentially stored in an instruction matrix memory. Each column of the instruction memory has data bits for regenerating an instruction set for controlling any one of many apparatus or processes. Each row of the instruction memory has a sample from each instruction set. In response to an enabling signal, the words from the address memory are sequentially read, interpreted, and the samples from the instruction memory caused to be read and for reconstructing the instruction set.

10 Claims, 9 Drawing Figures

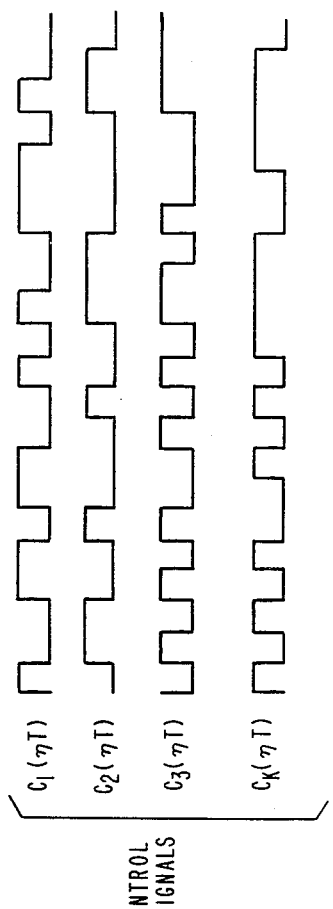

PROGRAM WORDS { 1(0,2),2(2,2),3(0,2),4(4,2),5(6,1),6(2,2),
7(7,3),8(2,2),9(4,2),10(7,3),11(6,1) }

PROGRAM IN BINARY CODE

| | | | | | | | | | | | |
|---|---|---|---|---|---|---|---|---|---|---|---|
| MEMORY LOCATION | 0 | 0 | 0 | 1 | 1 | 0 | 1 | 0 | 1 | 1 | 1 |
| | 0 | 1 | 0 | 0 | 1 | 1 | 1 | 1 | 0 | 1 | 1 |
| | 0 | 0 | 0 | 0 | 0 | 0 | 1 | 0 | 0 | 1 | 0 |
| GROUP LENGTH | 1 | 1 | 1 | 1 | 0 | 1 | 1 | 1 | 1 | 1 | 0 |
| | 0 | 0 | 0 | 0 | 1 | 0 | 1 | 0 | 0 | 1 | 1 |

GROUP SEQUENTIAL ORDER    1  2  3  4  5  6  7  8  9  10  11

PROGRAMMABLE DIGITAL CONTROLLER FOR GENERATING INSTRUCTIONS

TECHNICAL FIELD

This invention relates to digital controllers and, more particularly, to digital controllers with matrix memories.

BACKGROUND OF THE INVENTION

Manufacturing processes, data processing, telephone call connections, and the like, require many repetitious tasks. Furthermore, many different tasks may be simultaneously performed. The instructions for controlling these tasks may be generated, for each use, from sequential machines. Use of sequential machines, however, occasionally gives rise to errors. Consequently, a more reliable apparatus is required for use in telecommunications where there is a high volume of repetitious tasks.

SUMMARY OF THE INVENTION

A complete cycle of a plurality of instructions for controlling several machines or processes is represented in binary form. Samples are obtained by taking data bits from each instruction. The samples are examined, and repetitious groups of samples are identified.

Each unique group of samples is stored sequentially in an instruction matrix memory. Thus, each row in the instruction matrix memory comprises one sample, i.e., one bit, from each of the instructions. Furthermore, each column of the instruction matrix memory comprises bits for one complete instruction set for controlling one of the aforesaid apparatus or processes. Because only unique groups of samples are stored in the instruction matrix memory, some of the groups must be read out more than once.

Accordingly, an address matrix memory is used for storing the order in which the aforesaid unique groups of samples are to be read from the instruction matrix memory. The address matrix memory comprises a plurality of words. Each word comprises the location of the first sample of a unique group, in the instruction memory, and the number of samples in the unique group.

In response to an enabling signal, a word is read from the address memory. The word is decoded and a pointer indicates the location of the first sample, in the instruction memory, which is then read out. In response to clock signals, the aforesaid pointer is sequentially moved for permitting the remaining samples in the unique group to be read. When the last sample in the unique group has been read from the instruction matrix memory, a pointer associated with the address matrix memory is indexed and the next word is read therefrom. The aforesaid method for reading samples from the instruction matrix memory is repeated until all words have been read from the address matrix memory.

Many advantages accrue from the present invention. First, there is an economical use of memory.

Second, errors in generating instructions from the use of sequential machines are avoided. Instructions are stored in a read-only-memory (ROM), a programmable read-only-memory (PROM), or an erasable programmable read-only-memory (EPROM).

Third, instructions are read by using a programmable matrix memory, thereby introducing flexibility in that the same hardware may be reused by reprogramming.

BRIEF DESCRIPTION OF THE DRAWINGS

FIG. 1 shows a plurality of instructions, in analog form, for controlling a plurality of apparatus or processes;

FIG. 2 shows the binary form of the instructions in FIG. 1 and the identification of unique groups of samples therein;

DETAILED DESCRIPTION

Referring to FIG. 1, there is shown a plurality of instructions, $C_1(nT)$, $C_2(nT)$, $C_3(nT)$ ... $C_k(nT)$, in analog form for a portion of a cycle comprising n time periods, T.

Some of the aforesaid instructions may have fewer periods then others. That is, some of the aforesaid instructions may begin after others; and, some of the aforesaid instructions may end before others. The instructions with fewer periods are built-out, by stuffing with zeros (to indicate no activity), so that all instructions are equally long.

Referring to FIG. 2, there is shown in binary form the instructions, $B_1(nT)$, $B_2(nT)$, $B_3(nT)$ ... $B_k(nT)$, corresponding to the aforesaid instructions in analog form of FIG. 1. At each of the n periods, a sample, S, or vector, comprising one binary bit from each of the instructions is observed. Thus, samples $S_1$, $S_2$, $S_3$ ... $S_n$ are observed. Twenty-two such samples, as an example, are shown in FIG. 2.

By observing the entire set of samples, unique groups of samples may be seen to be repetitious. Thus, in FIG. 2, group $G_1$, comprising samples $S_1$ and $S_2$, is observed again as comprising samples $S_5$ and $S_6$. Likewise, groups $G_2$, $G_3$, $G_4$ and $G_5$ are repetitious in the twenty-two samples shown in FIG. 2. It is necessary then to store the samples in each unique group only once. In order to generate or to reconstruct the instruction set, however, it is necessary to know the order in which each group of samples is to be read from storage, the location of the first sample in each group, and the number of samples in each group.

Referring to FIG. 2 again, there is shown the group length, i.e., the number of samples in each group, the location of the first sample in each group for retrieval from memory, and the order in which each group of samples is to be read from memory.

Figures 3, 4, 5:
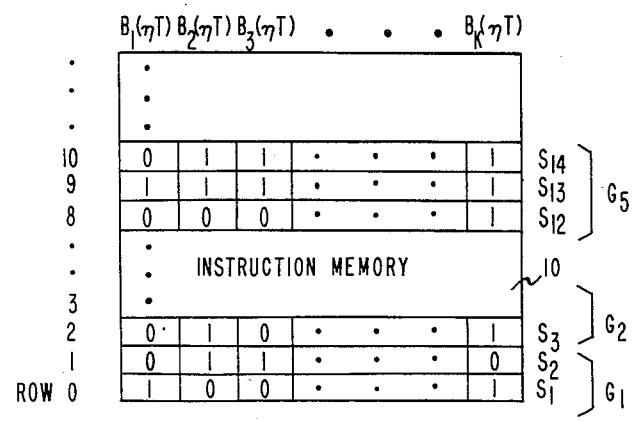
FIG. 3 shows an instruction matrix memory for storing the unique groups of samples in FIG. 2.
FIG. 4 shows a set of address words for reconstructing the instructions in FIG. 1.
FIG. 5 shows in binary form the set of address words of FIG. 3.

Referring to FIG. 3, there is shown a matrix memory 10 for storing the instruction set. Sample $S_1$ is stored in row 0 and Sample $S_2$ in row 1. Thus, the samples in unique group $G_1$ are stored in rows 0 and 1. As stated hereinabove, group $G_1$ also comprises samples $S_5$ and $S_6$. Instead of storing samples $S_5$ and $S_6$ again, they will be generated by rereading samples $S_1$ and $S_2$, respectively, thereby achieving economical use of memory space.

The remaining groups $G_2$, $G_3$, $G_4$ . . . are likewise stored (sequentially) in the instruction matrix memory 10. Each column of instruction memory 10 has stored therein the bits for regenerating the instruction for controlling any one process or apparatus. When the instructions are read from instruction memory 10, an entire row of bits is read; that is, one bit from each column of instructions is read.

Accurate regeneration of the instructions of FIG. 2, however, requires that the order for reading the rows of bits from instruction memory 10 be stored. Referring briefly to FIG. 2, there is shown the order in which each group of samples is to be read. A program for reading out the groups is then constructed and stored.

Referring to FIG. 4, there is shown a set of address words 1(0,2), 2(2,2), 3(0,2) . . . 11(6,1) necessary for reading the twenty-two samples from the six unique groups. Address word 1(0,2) indicates that row 0 should be read from the instruction matrix memory 10 in FIG. 3. The 2 in word 1(0,2) indicates that two rows should be read: row 0 and row 1 in FIG. 3.

Likewise, address word 2(2,2) indicates that row 2 in FIG. 3 should be read; and, two rows should be read. Word 3(0,2) indicates that row 0, in FIG. 3, should be read; and, two rows should be read. Because word 3(0,2) refers to samples $S_5$ and $S_6$ of FIG. 2, and because $S_5$ and $S_6$ are identical to $S_1$ and $S_2$, respectively, rows 0 and 1 are read again after the rows corresponding to word 2(2,2) are read. All the remaining address words are likewise accessed for reading the rows from instruction matrix memory 10 in FIG. 3.

Referring to FIG. 5, there is shown in binary form the set of address words of FIG. 4 suitable for storage in an address matrix memory.

Figure 6:
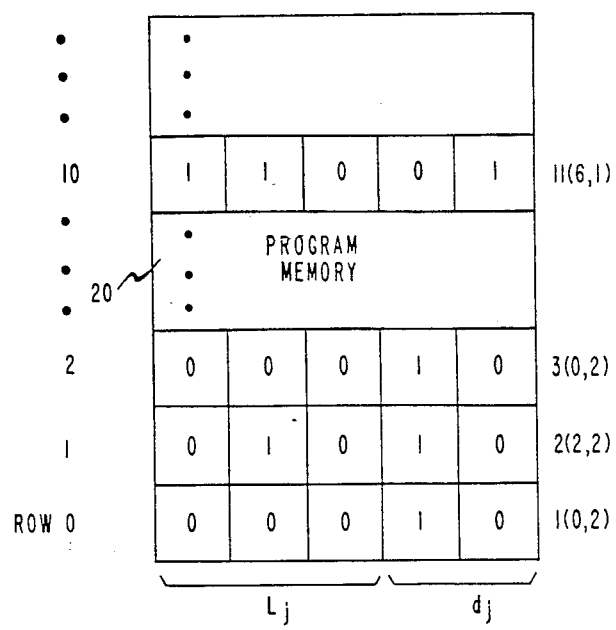
FIG. 6 shows an address matrix memory for storing the set of address words of FIG. 5.

Such an address matrix memory 20 is shown in FIG. 6. Referring to FIG. 6, there is shown stored in row 0 of address matrix memory 20 the address word 1(0,2) in binary form. The first three bits '000' indicate the location of the first sample $S_1$ to be read from the instruction matrix memory 10 of FIG. 3. The next two bits "10" indicate that two samples, $S_1$ and $S_2$, are to be read from the instruction matrix memory 10 of FIG. 3. Whereas only five bits, "00010", are shown as being stored in each row of the address memory of 20 of FIG. 6, it is merely illustrative as other longer or shorter codes may be stored for other applications.

The remaining address words 2(2,2), 3(0,2), 4(4,2) . . . 11(6,1) . . . are likewise stored in successive rows of the address memory 20 of FIG. 6.

Figure 7:
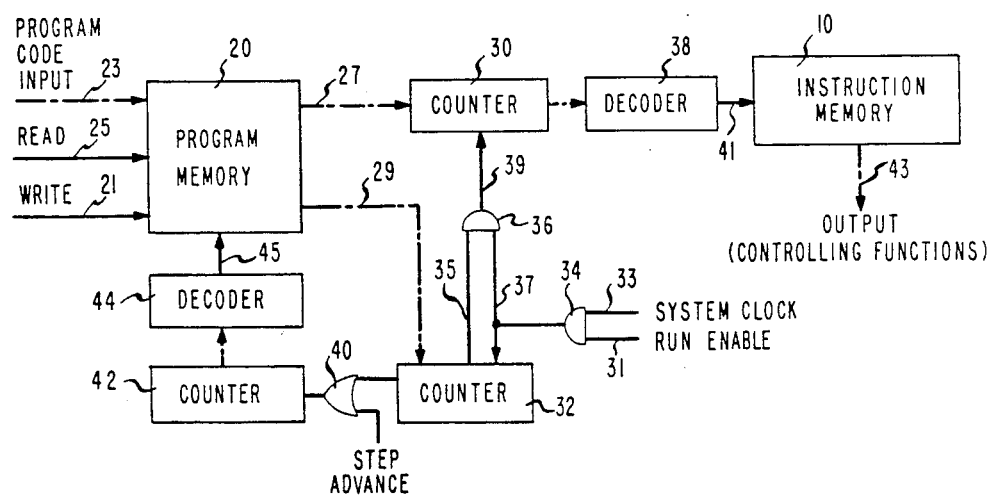
FIG. 7 shows a system for using the set of address words of FIG. 4 for reconstructing the instructions of FIG. 1.

Referring to FIG. 7, there is shown a system for generating the instructions of FIG. 2 for controlling a plurality of apparatus or processes. There is shown a write lead 21 connected to address memory 20 for enabling address words to be entered therein through leads 23. By a similar mechanism, the unique groups of samples are entered in the instruction matrix memory 10.

In response to an enabling signal on read lead 25, an address word, for example, 1(0,2), is read from the address memory 20. The row or location, 0, or '000' in binary form, of the sample, $S_1$, to be read from instruction memory 10 is transferred on leads 27 from address memory 20 to a binary counter 30. At the same time, the number 2, or '10' in binary form, of rows of samples to be read from instruction memory 10 is transferred on leads 29 from address memory 20 to binary counter 32.

Binary counter 32 is a variable modulo q counter, where q is determined by the maximum number of rows to be read in any of the aforesaid groups of samples.

Simultaneously with the read signal on lead 25, a run signal lead 31 is enabled. In synchronization with clock signals on lead 33, a pulse is passed through the AND gate 34 to AND gate 36 and to binary counter 32. In response to the pulse from AND gate 34, the modulo q binary counter 32 is indexed by one and a pulse is transmitted on lead 35 to AND gate 36. Because of the pulse from AND gate 34 on lead 37, the pulse on lead 35 is passed on lead 39 through AND gate 36 to counter 30 for entering the aforesaid row location from the address memory 20 and for passing the row location to decoder 38.

At decoder 38, the row location is decoded and pointer 41 is moved to the location of the row to be read. Thereafter, the row is read out from instruction memory 10 on leads 43 for controlling the plurality of apparatus or processes.

In response to each subsequent clock pulse through AND gate 34, counter 32 is indexed and a pulse generated for transmission to counter 30. In response thereto, counter 30 is indexed, i.e., the row number is changed to the next and passed to the decoder 38. The pointer 41, thus, is sequentially moved to the next row and its contents read.

When modulo q binary counter 32 has a count which equals the preset number q, in addition to the aforesaid pulse being transmitted to the counter 30 a pulse is transmitted through OR gate 40 to the binary counter 42. With each pulse from OR gate 40, the counter 42 is indexed by one. The number stored in counter 42 represents the row of address memory 20, from which the address word is to be read. After the counter 42 is indexed by one and the number stored therein, the number is transmitted to decoder 44 for moving pointer 45 to the location of the address word to be read. By the aforesaid method, the entire contents of the address memory 20 is read out therefrom, one address word at a time. For each address word, a corresponding group of samples is read from instruction memory 10. Thus, the entire set of control instructions of FIG. 2 is reconstructed.

As stated hereinabove with reference to FIG. 2, unique groups of samples that were repetitious were identified and each unique group was stored in instruction memory 10. Where, however, no unique groups are identified, each and every sample is stored by the method described hereinabove.

Figure 8:
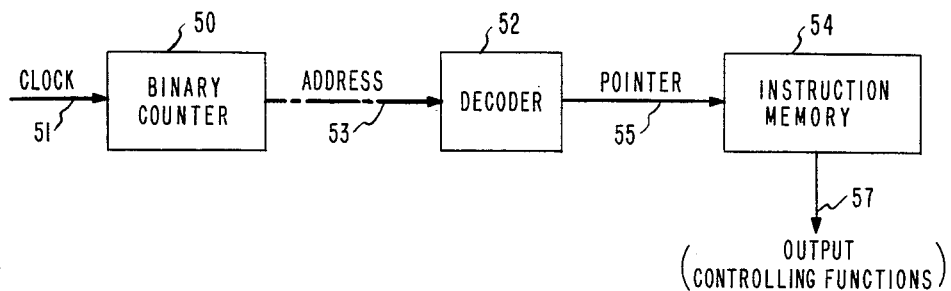
FIG. 8 shows a simplified version of the system in FIG. 7.

Referring to FIG. 8, there is shown a binary counter 50 for receiving clock pulses on lead 51, for increasing the counted number by one with each clock pulse, and for transmitting the number counted, in response to each of the aforesaid clock pulses, on address leads 53 to decoder 52. In response to each number received from counter 50, decoder 52 causes pointer 55 to be moved sequentially from one row to the next of instruction memory 54. Thus, the control instructions stored in the instruction memory 54 are sequentially read out onto leads 57. Because each row of instruction memory 54 is read sequentially, there is no need for an address memory.

Figure 9:
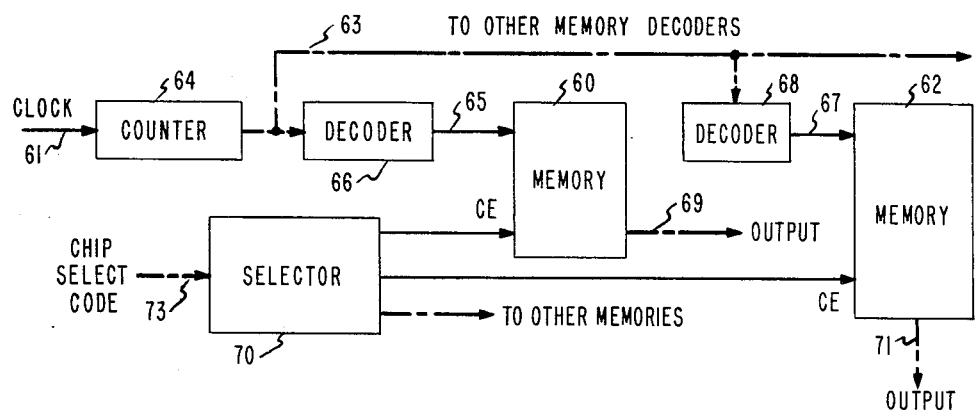
FIG. 9 shows a system comprising a plurality of systems as in FIG. 8.

Referring to FIG. 9, there is shown a system using a plurality of instruction memories 60,62, each memory storing samples as in FIG. 8. Memories 60,62, however, comprise instructions for controlling different processes or apparatus, i.e., memory 62 is not a duplicate of memory 60. In response to clock pulses on lead 61, binary counter 64 is indexed by one. The indexed number stored in counter 64 is gated onto leads 63 to decoders 66,68 simultaneously, thereby permitting instruction memories 60,62 to be addressed by pointers 65,67, respectively. Thus, the contents of each row of instructions in memories 60,62 are sequentially read out onto leads 69,71, respectively.

In response to a chip select code on leads 73, selector 70 identifies the instruction memory to be read. By this method, the control instructions are staggered.

What is claimed is:

1. In a telephone or telecommunications system, a programmable digital controller for generating a plurality of instructions, said instructions being in bits, each of said instructions being used for controlling a separate apparatus or process, said controller comprising
   a first memory having previously entered therein said instructions in a matrix form, each column of said matrix comprising one of said instructions, each row of said matrix comprising one bit from each of said columns, each of a plurality of blocks of said rows having a unique bit pattern, each block appearing only once,
   a second memory comprising a plurality of addresses previously entered therein, each of said addresses comprising two parts: a first part indicating one of said rows of said first memory to be read initially and a second part indicating one of said blocks of said rows to be read consecutively,
   means for reading said addresses, and
   means responsive to said addresses for reading said blocks of said rows.

2. The controller of claim 1 wherein said addresses are read sequentially, a predetermined number of said blocks of said rows being read repeatedly according the to order in which said addresses are read.

3. The controller of claim 2 wherein said means for reading said addresses comprises
   means for counting clock pulses up to a predetermined number,
   means for decoding said predetermined number of clock pulses into one of said addresses, and
   means, responsive to said decoding means, for reading one of said addresses from said second memory.

4. The controller of claim 3 wherein said means responsive to said addresses for reading said blocks of said rows comprises
   means for decoding said addresses,
   means, responsive to said decoding means, for reading one of said rows to be read initially within said block of rows in said first memory, and
   means, responsive to clock pulses, for sequentially moving said means for reading said rows, one row at a time, within said block of rows.

5. In a telephone or telecommunications system, a programmable digital controller comprising
   a first memory having binary digits (bits) of information in matrix form, said matrix form having a plurality of columns and a plurality of rows, each of said columns having instructions for controlling a separate process or apparatus, each of said rows having one bit from each of said columns, each of a plurality of groups of said rows forming unique bit patterns, said groups being read according to a predetermined pattern,
   a binary counter, being indexed by clock pulses, providing the address of each of said rows,
   a decoder responsive to said binary counter for decoding said addresses, and
   a pointer, responsive to said decoder, for locating said row to be read selectively, one row at a time.

6. In a telephone or telecommunications system, a programmable digital controller comprising a plurality of memories wherein information is held in matrix form, each matrix comprising columns and rows, each of said columns comprising information bits for controlling a separate process or a separate apparatus and each of said rows comprising one of said bits from each of said columns, each one of a plurality of groups of said rows comprising unique bit patterns, a predetermined number of said groups being read more than once,
   means for selectively addressing a first row in each of said groups of rows one group at a time in said memory and reading the remaining rows in said group one row at a time, and
   means for selecting one of said memories.

7. A method of generating instructions from a digital controller in a telephone or telecommunications system, said controller comprising
   a first memory having entered therein information in matrix form said matrix having a plurality of columns and a plurality of rows each of said columns having instructions for operating a separate apparatus or process, each of said rows having one bit from each of said columns, each of a plurality of blocks of said rows having a unique bit pattern, each block appearing only once,
   a second memory having a plurality of addresses entered therein, each address indicating one of said rows to be read initially and the number of rows to be read sequentially within each of said blocks of rows,
   means for reading said addresses one at a time, and
   means for decoding said addresses and for reading said rows one row at a time,
   said method comprising the steps of
   reading said addresses, one address at a time,
   decoding said address which has been read, and
   reading said rows within said block of rows to be read one row at a time, a predetermined number of said blocks being read selectively more than once.

8. The method of claim 7 wherein said addresses are read sequentially.

9. The method of claim 8 further comprising the steps of
   counting clock pulses up to a predetermined number,
   decoding said predetermined number of clock pulses into one of said addresses, and
   in response to said decoding step, reading one of said addresses from said second memory.

10. The method of claim 9 further comprising the steps of
    decoding said address,
    responsive to said decoding step, reading one of said rows to be read initially within each block of rows in said first memory, and
    sequentially reading all of said rows within each block one row at a time.

* * * * *